(12) United States Patent
Chretien et al.

(10) Patent No.: US 11,815,279 B2
(45) Date of Patent: Nov. 14, 2023

(54) ENVIRONMENTAL CONTROL SYSTEMS INCLUDING ELECTRIC MOTOR ASSEMBLIES AND METHODS OF OPERATION

(71) Applicant: Regal Beloit America, Inc., Beloit, WI (US)

(72) Inventors: Ludovic Andre Chretien, Columbia City, IN (US); Leonard Theodore McElhose, Tipp City, OH (US); Mohamad Khalil Dahouk, Fort Wayne, IN (US); Paul Steven Mullin, Yellow Springs, OH (US)

(73) Assignee: Regal Beloit America, Inc., Beloit, WI (US)

(*) Notice: Subject to any disclaimer, the term of this patent is extended or adjusted under 35 U.S.C. 154(b) by 619 days.

(21) Appl. No.: 16/891,924

(22) Filed: Jun. 3, 2020

(65) Prior Publication Data

US 2021/0381718 A1 Dec. 9, 2021

(51) Int. Cl.
*F24F 11/77* (2018.01)
*H02P 3/06* (2006.01)
*H02P 1/02* (2006.01)
*F25D 29/00* (2006.01)
*F25D 17/06* (2006.01)

(52) U.S. Cl.
CPC .............. *F24F 11/77* (2018.01); *F25D 17/06* (2013.01); *F25D 29/00* (2013.01); *H02P 1/029* (2013.01); *H02P 3/06* (2013.01); *F25D 2317/068* (2013.01); *F25D 2700/02* (2013.01)

(58) Field of Classification Search
CPC .... F24F 11/77; F25D 17/06; F25D 2317/068; F25D 2700/02
See application file for complete search history.

(56) References Cited

U.S. PATENT DOCUMENTS

| 6,225,904 B1 | 5/2001 | Jaffe et al. |
| 6,525,659 B2 | 2/2003 | Jaffe et al. |
| 9,427,097 B2 * | 8/2016 | Choueifati ............ A47F 3/0408 |
| 2017/0198964 A1 * | 7/2017 | Kim ...................... F25D 29/003 |
| 2018/0226857 A1 * | 8/2018 | Ishizaki ................ F04D 25/062 |

FOREIGN PATENT DOCUMENTS

| EP | 3685707 A1 * | 7/2020 |
| JP | 2017122522 A * | 7/2017 |

* cited by examiner

*Primary Examiner* — Ana M Vazquez
(74) *Attorney, Agent, or Firm* — Armstrong Teasdale LLP

(57) ABSTRACT

Described herein is an electric motor assembly for an environmental control system. The electric motor assembly includes a fan configured to rotate to circulate air within a controlled environment chamber of the environmental control system, and an electric motor coupled to the fan and configured to rotate the fan. The electric motor includes a motor controller configured to receive a braking control signal from a sensor associated with the controlled environment chamber. The braking control signal indicates an entrance to the controlled environment chamber is about to be opened. The motor controller is also configured to initiate braking the electric motor in response to receiving the braking control signal.

15 Claims, 3 Drawing Sheets

ENVIRONMENTAL CONTROL SYSTEMS INCLUDING ELECTRIC MOTOR ASSEMBLIES AND METHODS OF OPERATION

BACKGROUND

The following disclosure relates generally to environmental control systems including electric motor assemblies and, more particularly, to operation of electric motor assemblies in such environmental control systems.

Electric motor assemblies are used in commercial refrigeration equipment, such as display cases, reach-in coolers, ice machines, and others to move air for cooling products within the equipment. Specifically, electric motors drive evaporator fans that circulate air through cold evaporator coils and over the product, or the contents of the refrigeration equipment. Typically, the fan continues to run even when the door to the equipment is opened. Cold air is forced out of the equipment while warm air is introduced into the equipment, which results in additional energy use to cool that warm air.

In some known systems, the electric motor is shut off when the door is opened, based on signals from a mechanical door switch. However, these switches are only actuated when the door is opened by some threshold amount (e.g., when the door is at least 20% open). Consequently, the electric motor is not switched off until the door is already opened by this threshold amount. Moreover, the electric motors continue to spin after being shut off, sometimes for up to 20 seconds, while the door to the refrigeration equipment is open for an average of 10 seconds. Accordingly, in these known systems, the motor is likely still spinning, and moving air, for the entire time the door is open, which leads to undesirable levels of air exchange between the equipment and the ambient environment.

BRIEF DESCRIPTION

In one aspect, an electric motor assembly for an environmental control system is provided. The electric motor assembly includes a fan configured to rotate to circulate air within a controlled environment chamber of the environmental control system, and an electric motor coupled to the fan and configured to rotate the fan. The electric motor includes a motor controller configured to receive a braking control signal from a sensor associated with the controlled environment chamber. The braking control signal indicates an entrance to the controlled environment chamber is about to be opened. The motor controller is also configured to initiate braking the electric motor in response to receiving the braking control signal.

In another aspect, an environmental control system is provided. The environmental control system includes a controlled environment chamber having an entrance thereto, a sensor associated with the controlled environment chamber, and an electric motor assembly coupled to the controlled environment chamber. The electric motor assembly includes a fan configured to rotate to circulate air within the controlled environment chamber and an electric motor coupled to the fan and configured to rotate the fan. The electric motor includes a motor controller configured to receive a braking control signal from the sensor. The braking control signal indicates an entrance to the controlled environment chamber is about to be opened. The motor controller is also configured to initiate braking the electric motor in response to receiving the braking control signal.

In yet another aspect, a method of operating an electric motor assembly for an environmental control system is provided. The method includes operating, by a motor controller, an electric motor to drive a fan coupled to the electric motor and configured to rotate to circulate air within a controlled environment chamber of the environmental control system. the method also includes receiving, by the motor controller, a braking control signal indicating an entrance to the controlled environment chamber is about to be opened, and initiating braking, by the motor controller, the electric motor in response to receiving the braking control signal.

The features, functions, and advantages that have been discussed can be achieved independently in various examples of the present disclosure or may be combined in yet other examples, further details of which can be seen with reference to the following description and drawings.

DETAILED DESCRIPTION

The environmental control systems described herein include an electric motor assembly for moving air in enclosed chambers, such as refrigeration equipment, warming equipment, and other heating and cooling systems. The electric motor assembly includes an electric motor and a fan coupled to the electric motor. During operation of the electric motor, the motor rotates the fan to circulate air within the enclosed chamber (e.g., to cool or heat contents of the chamber). The motor includes a motor controller that controls operation of the motor. In the exemplary embodiment, the motor controller receives a braking control signal from a sensor associated with the chamber (e.g., a touch sensor on an exterior surface of the chamber). The braking control signal indicates that an entrance to the chamber is about to be opened. In response to receiving the braking control signal, the motor controller is configured to initiate braking the motor.

The disclosed electric motor assembly thereby enables stopping the motor before the chamber is opened, or within seconds of opening, or less. Accordingly, the motor operates for less time while the chamber is open, and, in some embodiments, the motor is fully stopped before the chamber is opened. The early braking reduces air exchange between the chamber and the ambient environment, which reduces energy consumption by the environmental control system.

Figure 1:
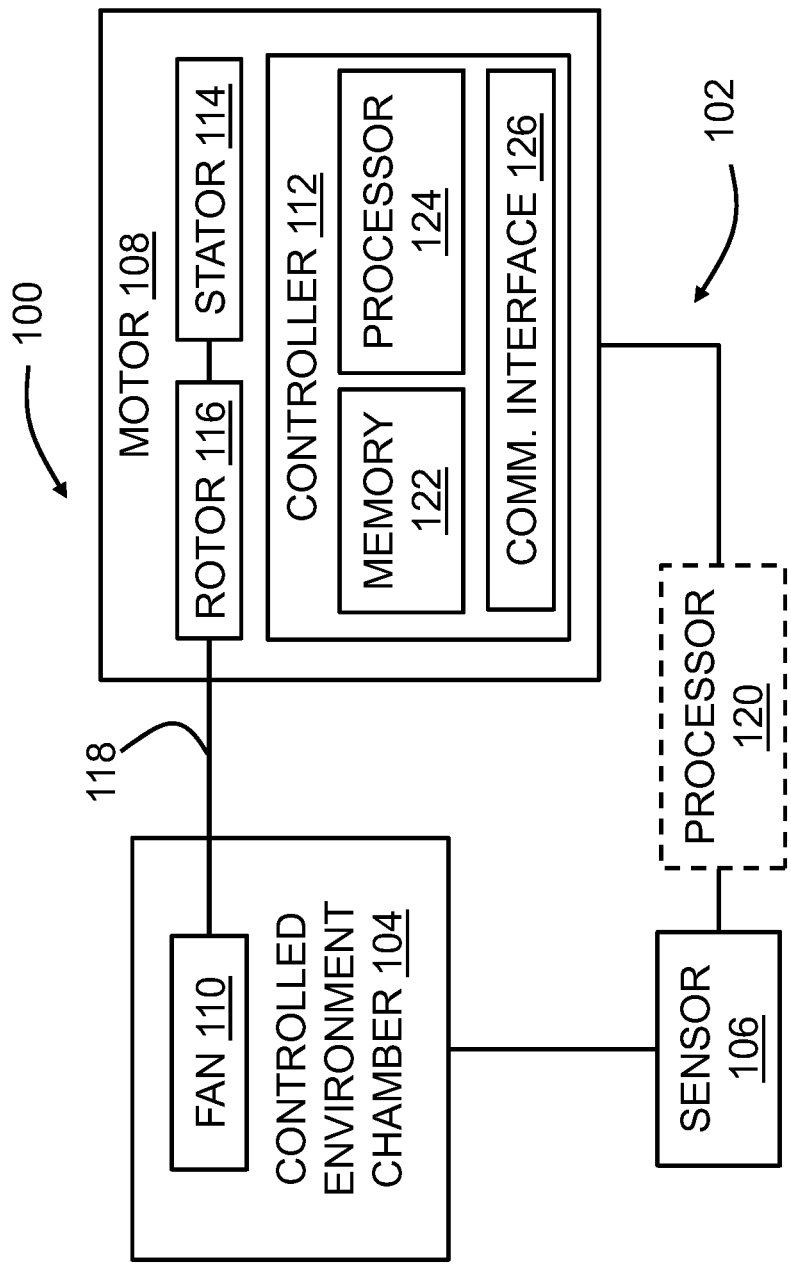
FIG. 1 is a schematic diagram of an environmental control system including an electric motor assembly and a controlled environment chamber.
Figure 2:
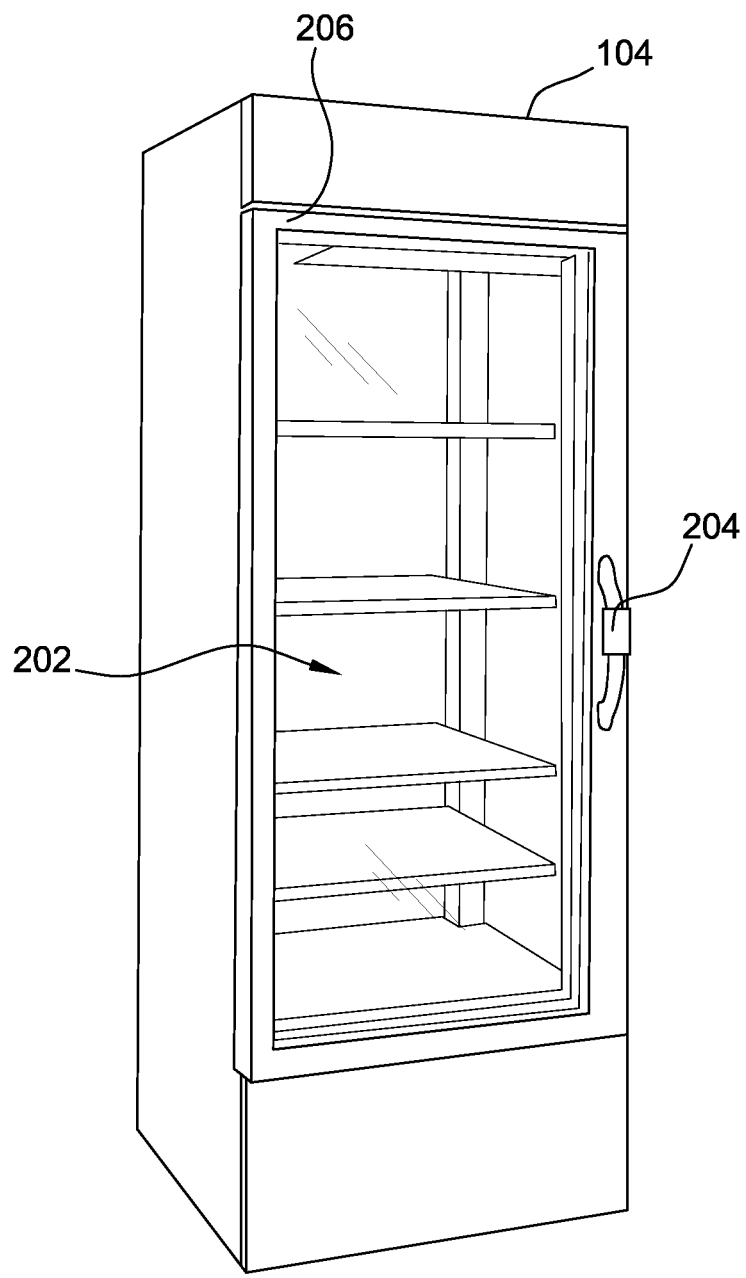
FIG. 2 depicts one embodiment of the controlled environment chamber.

FIG. 1 is a schematic diagram of an exemplary environmental control system 100, such as a commercial refrigeration system (e.g., a display case, reach-in cooler, ice machine) or a heating system (e.g., an oven, warming drawer). Environmental control system 100 includes an electric motor assembly 102, a controlled environment chamber 104, and a sensor 106. Controlled environment chamber 104 defines an interior controlled-temperature environment in which air is circulated and maintained at a desired temperature that is different from (e.g., cooler or warmer than) a temperature of an ambient environment surrounding chamber 104. Chamber 104 may be fully enclosed (e.g., via walls and one or more doors) or substantially enclosed (e.g., may include a curtain). In the exemplary embodiment, chamber 104 includes an entrance (not shown) by which a user (e.g., a person, a robot or machine, etc.) can gain access to the interior of chamber 104. The entrance may include a hinged door, a sliding door, a curtain, or any number or combination thereof. FIG. 2 depicts one exemplary embodiment of controller environment chamber 104, embodied as a refrigeration system. The entrance to chamber 104 is embodied as one or more doors 202.

Turning back to FIG. 1, electric motor assembly 102 includes an electric motor 108 mechanically coupled to a fan 110. More specifically, fan 110 is rotatably coupled to motor 108 such that operation of motor 108 causes fan 110 to rotate. Fan 110 is installed (e.g., positioned, mounted, coupled, etc.) within controlled environment chamber 104. Motor 108 drives fan 110 to rotate and circulate air within chamber 104 (e.g., across a cooling or heating source, around refrigerated or heated product, etc.). Motor 108 includes a motor controller 112 a stator 114 (e.g., a plurality of windings configured to be energized), and a rotor 116 electromagnetically coupled to stator 114 and configured to turn relative to stator 114 when stator 114 is energized. In one embodiment, fan 110 is coupled to rotor 116 via a shaft 118.

To reduce, or limit, air exchange between chamber 104 and the ambient environment when the entrance to chamber 104 is opened, motor controller 112 is configured to initiate braking motor 108 in response to a signal (e.g., a braking control signal) received from sensor 106, as described further herein. Initiating braking motor 108 may include, for example, applying a mechanical brake to rotor 116, slowing rotor 116 in a generator mode, disconnecting windings of motor stator 114 from a power source, modulating or dissipating current through windings of motor stator 114, shorting the windings of motor stator 114, any other braking method, or any combination thereof. Any of these braking processes are initiated by motor controller 112 upon receipt of the braking control signal from sensor 106.

Initiating braking motor 108 causes fan 110 to slow and eventually stop rotating. In some embodiments, motor controller 112 may be additionally configured to initiate a fan braking process, to stop fan 110 from rotating after braking motor 108. In some instances, motor controller 112 is configured to determine whether fan 110 is still spinning or rotating above a predetermined threshold speed after motor 108 is stopped. For example, motor controller 112 interprets signals from one or more speed or acceleration sensors coupled to fan 110 and/or shaft 118. In such instances, if fan 110 is still spinning or rotating above the predetermined threshold speed after motor 108 is stopped, motor controller 112 brakes fan 110, for example, by transmitting a control signal to fan 110 or, more specifically, a braking component for fan 110. In other instances, motor controller 112 always transmits such a control signal to brake fan 110, without a determination of whether fan 110 is spinning.

Sensor 106 is associated with chamber 104 and is configured to sense when the entrance to chamber 104 is about to be opened. As used herein, "about to be opened" may refer to an imminent opening by a user (e.g., within a threshold period of time, such as one second) and/or a likely opening by a user. Sensor 106 generates a braking control signal when sensor 106 detects the entrance to chamber 104 is about to be opened, and transmits, directly or indirectly, the braking control signal to motor controller 112. In some embodiments, sensor 106 includes or is communicatively coupled to a processor 120. Sensor 106 transmits raw sensor data to processor 120, which interprets the sensor data to determine whether the entrance to chamber 104 is about to be opened. Processor 120 generates and transmits the braking control signal to motor controller 112. In some such embodiments, sensor 106 continuously transmits sensor data to processor 120. Alternatively, sensor 106 periodically transmits sensor data to processor 120 (e.g., once every second, every 50 milliseconds, etc.) or only transmits sensor data when sensor 106 is triggered, as described further herein.

Sensor 106 may be located external and proximate to chamber 104, such as, for example, above chamber 104, below chamber 104, to a side of chamber 104, or in front of chamber 104. In some embodiments, sensor 106 is located within or is coupled to the entrance to chamber 104. In some such embodiments, sensor 106 is located within or is coupled to a handle of the entrance, where the entrance is a door. In certain embodiments, as shown in FIG. 2, sensor 106 includes a touch sensor 106 located within or coupled to a handle 204 of door 202. Sensor 106 may be a capacitive touch sensor, resistive touch sensor, or any other suitable touch sensor. When a user interacts with (e.g., contacts) handle 204, sensor 106 detects this interaction (e.g., sensor 106 is triggered by this interaction), which represents that the entrance (e.g., door 202) to chamber 104 is about to be opened. Sensor 106 generates and transmits the braking control signal in response to detecting this interaction. Additionally or alternatively, sensor 106 may be located in or coupled to an alternative portion of chamber 104 that is likely to be touched by a user when the user intends to open chamber 104, such as an exterior frame 206 of chamber 104.

Sensor 106 may additionally or alternatively include a light- or motion-based sensor associated with chamber 104, such as a camera, motion sensor, infrared sensor, RADAR, and the like, a heat-based sensor, or a weight or pressure sensor (e.g., located in a floor surface in front of chamber 104). In such embodiments, sensor 106 detects a user is present in front of chamber 104 or otherwise in a position to access chamber 104 (e.g., sensor 106 is triggered), which indicates the entrance is about to be opened. In some embodiments, sensor 106 may use processor 120 to make additional interpretations of sensor data, such as to determine a length of time that the user is present in front of chamber 104, a position of the user, and the like. For example, where sensor 106 includes a camera or generates image content, sensor 106 or processor 120 (or any other component of system 100) may include image processing capabilities. Sensor 106 or processor may process image content generated by sensor 106 to determine the presence of a user, the position of the user, and the like. In some embodiments, sensor 106 (via processor 120) may incorporate these other parameters into a determination that the entrance to chamber 104 is about to be opened and, in turn, when to generate and transmit the braking control signal. For example, sensor 106 may determine a user has been present in front of chamber 104 for a threshold period of time (e.g., 5 or more seconds), which indicates the user is likely to open the entrance to chamber 104. As another example, sensor 106 may determine the user is reaching towards or in contact with chamber 104, which indicates the user is likely to open the entrance to chamber 104.

In the exemplary embodiment, motor controller 112 is configured to initiate braking motor 108 within a predetermined amount of time of receiving the braking control signal. The predetermined amount of time may be, for example, 1 second or less. In the exemplary embodiment, motor controller 112 is configured to initiate braking motor 108 before the entrance to chamber 104 is opened. Therefore, motor 108 is slowed, or stopped, and is no longer driving rotation of fan 110 in less time than in conventional systems, and air exchange between chamber 104 and the ambient environment is reduced. In the exemplary embodiment, by initiating the motor braking process before chamber 104 is opened, motor 108 is not operating or fan 110 is not spinning for as much time while chamber 104 is open. Moreover, in one exemplary embodiment, motor 108 is not operating or fan 110 is stopped before chamber 104 is opened.

In some embodiments, sensors 106 are configured to detect when the entrance to chamber 104 is closed. System 100 may include additional or alternative sensors to detect the entrance to chamber 104 is closed, such as a switch or pressure sensor within the entrance (e.g., the door). Any such sensors or processor 120 coupled thereto may transmit another signal (e.g., a restart control signal) to motor controller 112. Upon receiving the restart control signal, motor controller 112 is configured to restart motor 108.

Sensors 106 may additionally or alternatively detect or otherwise determine (e.g., using processor 120) that chamber 104 is not about to be opened or no user is present in front of chamber 104. For example, where sensor 106 is a touch sensor, a user touches handle 204, and sensor 106 generates a signal indicative of this contact, which is sent to motor controller 112 (in some instances, via processor 120) as the braking control signal. Once the user releases handle 204, sensor 106 no longer detects any contact between the user and handle 204. Sensor 106 therefore does not generate any signal indicative of user contact, and in turn, no braking control signal is generated or sent to motor controller 112. In the absence of a braking control signal, or after a predetermined amount of time has passed since receiving a braking control signal (e.g., 5 seconds), motor controller 112 is configured to restart motor 108.

It should be readily understood that system 100 may include any number or combination of sensors 106 and is not limited to a single sensor or any one type of sensor. Additionally, motor 108 may include any suitable type of motor, and is not limited to the motor configuration described herein. It should also be understood that although system 100 is described herein as a including a chamber defining an interior space having a controlled temperature that is colder than an ambient environment, the present disclosure is equally applicable to a system with a chamber defining an interior space having a controlled temperature that is higher than an ambient environment (e.g., an oven, warming equipment, etc.).

In the exemplary embodiment, motor controller 112 includes at least one memory device 122 and a processor 124 that is communicatively coupled to memory device 122 for executing instructions. In one embodiment, memory device 122 and processor 124 are integrated into a single unit. In some embodiments, executable instructions are stored in memory device 122. In the exemplary embodiment, motor controller 112 performs one or more operations described herein by programming processor 124. For example, processor 124 may be programmed by encoding an operation as one or more executable instructions and by providing the executable instructions in memory device 122.

In the exemplary embodiment, memory device 122 is one or more devices that enable information such as executable instructions or other data to be stored and retrieved. Memory device 122 may include one or more computer readable media, such as, without limitation, dynamic random access memory (DRAM), static random access memory (SRAM), a solid state disk, or a hard disk. Memory device 122 may be configured to store, without limitation, application source code, application object code, source code portions of interest, object code portions of interest, configuration data, execution events or any other type of data. In the exemplary embodiment, memory device 122 includes firmware or initial configuration data for motor controller 112.

Processor 124 may include one or more processing units (e.g., in a multi-core configuration). Further, processor 124 may be implemented using one or more heterogeneous processor systems in which a main processor is present with secondary processors on a single chip. Alternatively, processor 124 may be a symmetric multi-processor system containing multiple processors of the same type. Further, processor 124 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), or any other circuit capable of executing the functions described herein. In the exemplary embodiment, processor 124 controls operation of motor controller 112.

Motor controller 112 also includes a communication interface 126. Communications interface 126 may include one or more wired or wireless hardware interface(s), such as, for example, universal serial bus (USB), RS232 or other serial bus, CAN bus, Ethernet, near field communication (NFC), WiFi, Bluetooth, or any other suitable digital or analog interface for establishing one or more communication channels directly or indirectly between motor controller 112 and sensor 106, and, in some embodiments, with processor 120 or fan 110. For example, braking control signals, restart controls signals, or any other signals from sensor 106 may be communicated to motor controller 112 through communications interface 126. In certain embodiments, control signals for braking fan 110 may be communicated from motor controller 112 to fan 110 though communication interface 126.

Figure 3:
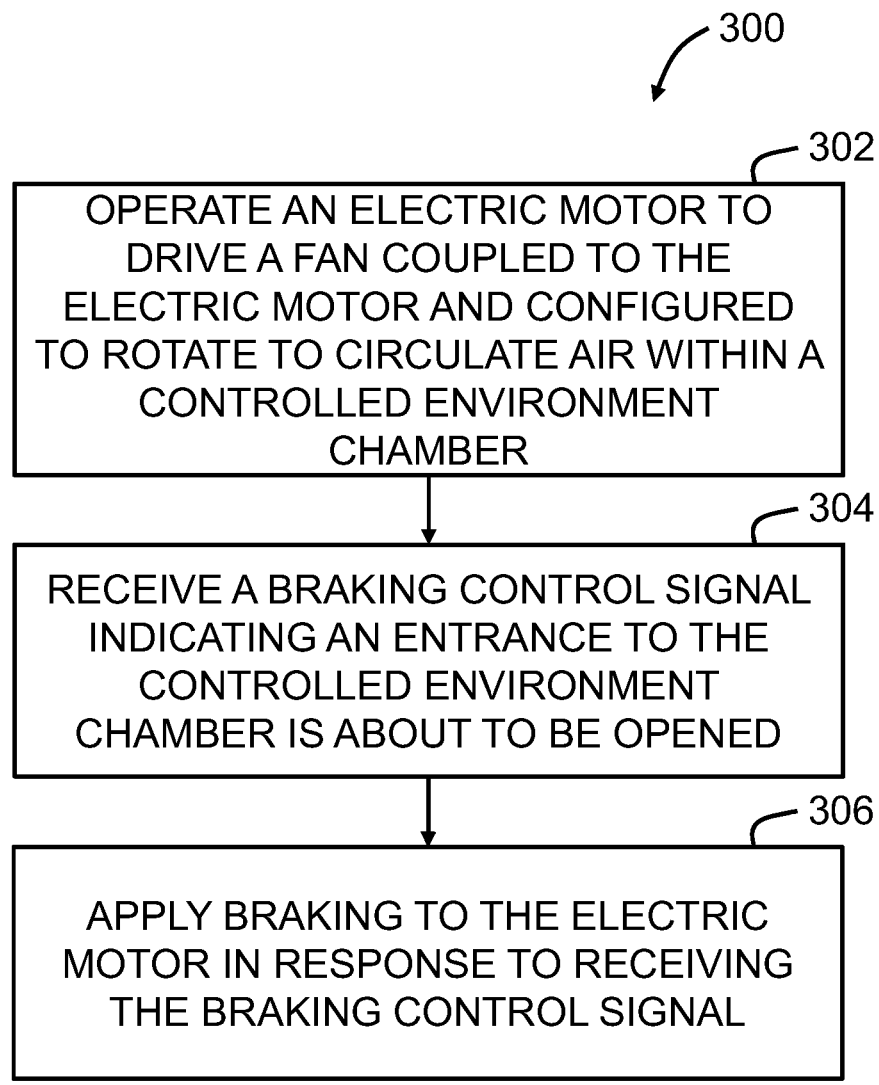
FIG. 3 is a flow diagram of an exemplary method of operating an electric motor assembly for the environmental control system of FIG. 1.

FIG. 3 is a flow diagram of a method 300 of operating an electric motor assembly, in accordance with the present disclosure. Method 300 is implemented using motor controller 112, as shown in FIG. 1.

In the exemplary embodiment, method 300 includes operating 302 an electric motor (e.g., motor 108) to drive a fan (e.g., fan 110) coupled to the electric motor and configured to rotate to circulate air within a controlled environment chamber (e.g., chamber 104) of an environmental control system (e.g., system 100, all shown in FIG. 1).

Method 300 also includes receiving 304 a braking control signal indicating an entrance to the controlled environment chamber is about to be opened. The braking control signal may be received 304 from a sensor (e.g., sensor 106, also shown in FIG. 1), as described herein. Method 300 further includes initiating braking 306 the electric motor in response to receiving the braking control signal.

Method 300 may include additional, fewer, or alternative steps. For example, in some embodiments, initiating braking 306 includes initiating braking a rotor (e.g., rotor 116) of the electric motor. In some embodiments, method 300 includes receiving a second signal indicating the entrance to the controlled environment chamber is closed, and re-starting the electric motor in response to receiving the second signal. In some embodiments, method 300 includes initiating braking the fan in response to receiving the braking control signal. Initiating braking 306 may include initiating braking the electric motor before the entrance is opened.

The environmental control systems described herein include an electric motor assembly for moving air in enclosed chambers, such as refrigeration equipment, warming equipment, and other heating and cooling systems. The electric motor assembly includes an electric motor and a fan coupled to the electric motor. During operation of the electric motor, the motor rotates the fan to circulate air within the enclosed chamber (e.g., to cool or heat contents of the chamber). The motor includes a motor controller that controls operation of the motor. In the exemplary embodiment, the motor controller receives a braking control signal from a sensor associated with the chamber (e.g., a touch sensor on an exterior surface of the chamber). The braking control signal indicates that an entrance to the chamber is about to be opened. In response to receiving the braking control signal, the motor controller is configured to initiate braking the motor.

The electric motor assembly described herein reduces a time for the motor to stop spinning. In one exemplary embodiment, the motor stops spinning before the entrance to the chamber is opened. In this way, air exchange between the chamber and the ambient environment is greatly reduced, which reduces energy consumption of the environmental control system.

The systems and methods described herein are not limited to the specific embodiments described herein, but rather, components of the systems and/or steps of the methods may be utilized independently and separately from other components and/or steps described herein.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor assembly for an environmental control system, said electric motor assembly comprising:
   a fan configured to rotate to circulate air within a controlled environment chamber of the environmental control system; and
   an electric motor coupled to said fan and configured to rotate said fan, said electric motor comprising a motor controller programmed to:
   receive a braking control signal from a sensor associated with the controlled environment chamber, the braking control signal indicating an entrance to the controlled environment chamber is about to be opened;
   in response to receiving the braking control signal, initiate braking said electric motor before the entrance is opened;
   receive a second signal indicating the entrance to the controlled environment chamber is closed; and
   re-start said electric motor in response to receiving the second signal.

2. The electric motor assembly of claim 1, wherein said electric motor further comprises:
   a stator comprising windings configured to be energized; and
   a rotor electromagnetically coupled to said stator and configured to turn relative thereto when said stator is energized to rotate said fan, and
   wherein said motor controller is further programmed to initiate braking said rotor.

3. The electric motor assembly of claim 1, wherein said motor controller is further programmed to re-start said electric motor after a predetermined amount of time has passed after receiving the braking control signal.

4. The electric motor assembly of claim 1, wherein said motor controller is further programmed to initiate braking said fan in response to receiving the braking control signal.

5. The electric motor assembly of claim 1, wherein said motor controller is communicatively coupled to the sensor and is programmed to receive the braking control signal over a wired or wireless communication channel.

6. An environmental control system comprising:
   a controlled environment chamber having an entrance thereto;
   a sensor associated with said controlled environment chamber; and
   an electric motor assembly coupled to said controlled environment chamber, said electric motor assembly comprising:
   a fan configured to rotate to circulate air within said controlled environment chamber; and
   an electric motor coupled to said fan and configured to rotate said fan, said electric motor comprising a motor controller programmed to:
   receive a braking control signal from said sensor, the braking control signal indicating said entrance is about to be opened;
   in response to receiving the braking control signal, initiate braking said electric motor before said entrance is opened;
   receive a second signal indicating said entrance to said controlled environment chamber is closed; and
   re-start said electric motor in response to receiving the second signal.

7. The environmental control system of claim 6, wherein said sensor is coupled to said entrance of said controlled environment chamber.

8. The environmental control system of claim 7, wherein said sensor is a touch sensor coupled to a handle of said entrance.

9. The environmental control system of claim 8, wherein said sensor generates and transmits the braking control signal in response to a user interacting with said handle.

10. The environmental control system of claim 6, wherein said sensor is at least one of a light-based sensor, a motion-based sensor, a camera, a thermal sensor, a weight sensor, or a pressure sensor.

11. The environmental control system of claim 6, wherein said electric motor further comprises:
   a stator comprising windings configured to be energized; and
   a rotor electromagnetically coupled to said stator and configured to turn relative thereto when said stator is energized to rotate said fan, and
   wherein said motor controller is further programmed to initiate braking said rotor.

12. The environmental control system of claim 6, wherein said motor controller is further programmed to initiate braking said fan in response to receiving the braking control signal.

13. A method of operating an electric motor assembly for an environmental control system, said method comprising:
- operating, by a motor controller, an electric motor to drive a fan coupled to the electric motor and configured to rotate to circulate air within a controlled environment chamber of the environmental control system;
- receiving, by the motor controller, a braking control signal indicating an entrance to the controlled environment chamber is about to be opened;
- in response to receiving the braking control signal, initiating braking, by the motor controller, the electric motor before the entrance is opened;
- receiving, by the motor controller, a second signal indicating the entrance to the controlled environment chamber is closed; and
- re-starting, by the motor controller, the electric motor in response to receiving the second signal.

14. The method of claim 13, wherein the electric motor includes a stator including windings configured to be energized, and a rotor electromagnetically coupled to the stator and configured to turn relative thereto when the stator is energized to rotate the fan, and wherein said initiating braking comprises initiating braking the rotor.

15. The method of claim 13, further comprising initiating braking, by the motor controller, the fan in response to receiving the braking control signal.

* * * * *